US008638907B1

(12) United States Patent
Schumacher

(10) Patent No.: US 8,638,907 B1
(45) Date of Patent: Jan. 28, 2014

(54) OPTIMIZING IDENTIFICATION OF PUBLIC SAFETY ANSWERING PLATFORM NEXT GENERATION 911 MEDIA SUPPORT

(75) Inventor: Gregory Schumacher, Holliston, MA (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 13/589,798

(22) Filed: Aug. 20, 2012

(51) Int. Cl.
*H04M 11/04* (2006.01)
(52) U.S. Cl.
USPC .......................................... 379/45; 455/404.1
(58) Field of Classification Search
USPC ......... 379/45, 22.01, 26.01; 455/404.1, 404.2
See application file for complete search history.

(56) References Cited

U.S. PATENT DOCUMENTS

2012/0302217 A1* 11/2012 Sennett et al. ............. 455/414.1

OTHER PUBLICATIONS

National Emergency Number Association (NENA) Technical Committee Chairs, NENA Detailed Functional and Interface Standards for the NENA i3 Solution (TSD), NENA 08-003 v1, Jun. 14, 2011.
Intrado Inc., "Articles", Available at: http://www.intrado.com/news/articles/, 2012.
Verint Systems Inc., "Product Portfolio—Impact 360 for Public Safety Powered by Audiolog: Multimedia recording, speach analytics, eLearning and coaching, performance scorecards, forecasting and scheduling, and citizen surveys", Available at: http:verint.com/public_safety/overview.cfm?article_level11_category_id=422, 2012.
Serge Panossian and Deep Medhi, "Towards Providing Enhanced 911 Emergency Service in IP Telephony", University of Missouri—Kansas City, Kansas City, MO, USA, Nov. 1998.
verticalnews.com, "Verizon and Intrado Join Forces to Deploy Next-Generation 911 Services Nationwide", Journal of Technology & Science, Mar. 6, 2011.
Todd Poremba, "Recommendations for Implementing NG9-1-1 Components", TeleCommunication Systems (TCS)-Enabling Convergent Technologies, Jun. 4, 2010.
Ashok Bindra, "Vermont Launches First Statewide Text-to-911 Trial for Emergency Help", Available at: http://www.tmcnet.com/channels/e911-hosted-solutions/articles/289353, May 8, 2012.
Monica Gleberman, "Virginia's Franklin County Upgrading to Next-Generation 911 System", Available at: http://www.tmcnet.com/channels/e911-hosted-solutions/articles/246832, Dec. 19, 2012.
Intrado Inc., "Public Safety—NG 9-1-1", Available at: http://www.intrado.com/solutions/PSAP, 2012.

* cited by examiner

*Primary Examiner* — Quoc D Tran

(57) ABSTRACT

A method, system, and medium are provided for generating a profile for public safety answering platforms. The profile identifies media formats or media format combinations that are supported by the PSAPs at various cell sector locations maintained by a network provider. A network server selects a cell sector and generates test emergency services calls. The test emergency services calls are transmitted to a PSAP but are optimized to reduce a number of test emergency services calls based on media support included in the profile of the PSAP. The PSAP generates a response that indicates whether the PSAP supports a media format identified in the test emergency services call. The PSAP may rely on capabilities of a secondary PSAP to generate the response. The PSAP transmits the response to the network server for storage in the profile.

20 Claims, 7 Drawing Sheets

OPTIMIZING IDENTIFICATION OF PUBLIC SAFETY ANSWERING PLATFORM NEXT GENERATION 911 MEDIA SUPPORT

SUMMARY

A high-level overview of various embodiments of the invention is provided here for that reason, to provide an overview of the disclosure and to introduce a selection of concepts that are further described below in the detailed-description section. This summary is not intended to identify key features or essential features of the claimed subject matter, nor is it intended to be used as an aid in isolation to determine the scope of the claimed subject matter. In brief and at a high level, this disclosure describes, among other things, ways to identify a public safety answering platform (PSAP) and media formats supported by the PSAP or unsupported by the PSAP and ways to reduce a number of test emergency services call generated to probe the PSAPs.

The wireless network, in some embodiments, includes a network server that generates test emergency services calls. The wireless network may include multiple cell sectors. Each cell sector may be covered by one or more PSAPs, one per media format, and are associated with a profile. The profile for the cell sector stores an identifier for the PSAP and the corresponding known media formats supported by the PSAP. The profile, in at least one embodiment, includes the media formats unsupported by the PSAP. The profile may be stored in a database connected to the network server.

The network server generates test emergency services calls for each cell sector to identify the PSAPs covering each cell sector and to identify the media support provided by each of the PSAPs. The network server may select a cell sector maintained by the wireless network provider. In turn, the network server obtains the profiles corresponding to the cell sector and extracts the unsupported media formats. Based on these media formats, test emergency services calls are generated and transmitted to the PSAPs. The test emergency services calls may identify one or more media formats supported by the wireless network. The network server receives responses from the PSAPs. The responses indicate whether the PSAPs now support media format previously identified as unsupported. The profiles for the PSAPs are updated based on the responses returned by the PSAPs.

In another embodiment, the network server obtains profiles corresponding to a selected cell sector and extracts the supported media formats. Based on these media formats, test emergency services calls are generated and transmitted to the PSAPs. The test emergency services calls may identify one or more media formats supported by the wireless network. In one embodiment, the test emergency services calls include a combination of media formats that are identified as supported in the PSAP profiles. The network server receives responses from the PSAPs. The responses indicate whether the PSAPs support combinations of the media formats identified as supported in the PSAP profiles. The profiles for the PSAPs are updated based on the responses.

In other embodiments, PSAPs may share responsibility for different media formats. For instance, a first PSAP may support a first group of media formats and a second PSAP may support a second group of media formats. Thus, two or more PSAPs may be related by agreement or otherwise, when responding to test emergency services calls or to real emergency services calls. In one embodiment, the first PSAP may receive a test emergency services call. The first PSAP may extract media formats requested in the test emergency services calls. The current media format capabilities are identified for the first PSAP. If any of the current capabilities match the extracted media formats, the first PSAP generates a response that includes the matching capabilities. If a match is not found, the first PSAP locates one or more secondary PSAPs and generates a response based on the capabilities of the one or more secondary PSAPs. The first PSAP transmits the response to the network server for storage in the profile.

BRIEF DESCRIPTION OF THE SEVERAL VIEWS OF THE DRAWINGS

Illustrative embodiments of the invention are described in detail below with reference to the attached drawing figures, and wherein.

DETAILED DESCRIPTION

Figure 1:
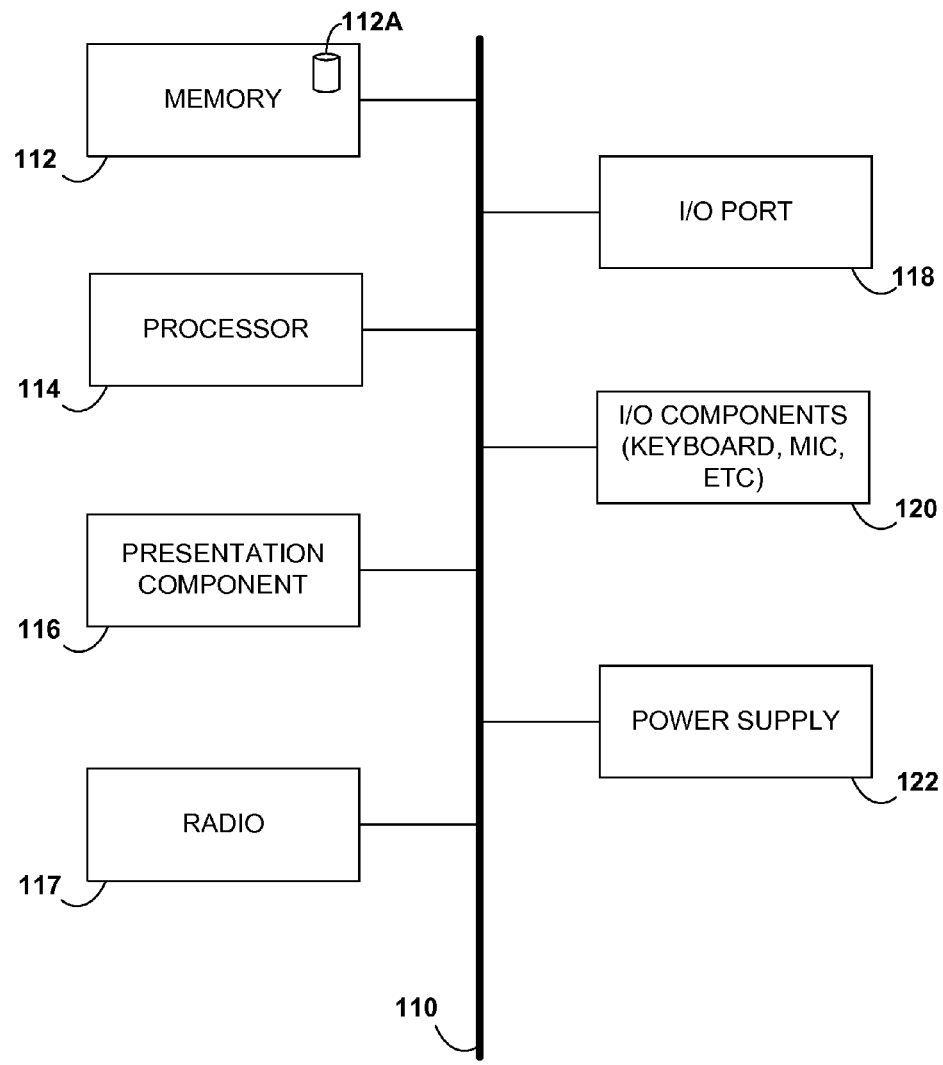
FIG. 1 depicts a block diagram of an exemplary network device in accordance with embodiments of the invention.

The subject matter of the patent is described with specificity herein to meet statutory requirements. However, the description itself is not intended to define the invention, which is what the claims do. Rather, the claimed subject matter might be embodied in other ways to include different steps or combinations of steps similar to the ones described in this document, in conjunction with other present or future technologies. Moreover, although the term "step" or other generic term might be used herein to connote different components or methods employed, the terms should not be interpreted as implying any particular order among or between various steps herein disclosed unless and except when the order of individual steps is explicitly described.

Embodiments of the invention are directed to identifying media format support at PSAPs that cover cell sectors maintained by a wireless network provider. A network server may be configured to reduce the generation of test emergency services calls that are transmitted to a PSAP. The network server optimizes updates to PSAP profiles. The profile includes an indication of the media formats support provided by the PSAP and the media formats unsupported by the PSAP. The network server in the wireless network may periodically transmit test emergency services calls to the loopback interface of the PSAP to query the capability of the PSAP, which is stored in the profile. The carrier implements optimizations that prevent unnecessary test calls from being made to the PSAP. In one embodiment, the test emergency services calls are limited to the media formats that are known to be unsupported by the PSAPs based on prior test or real emergency services calls. In another embodiment, the test emergency services calls are limited to combinations of the media formats that are known to be supported by the PSAPs based on prior test or real emergency services calls. Accordingly, the network server is configured to optimize the process of automatically determining the media handling capabilities of each of the NG 9-1-1 PSAPs while reducing the number of test emergency services calls and resulting signaling received by the PSAPs.

In other embodiments, the network server may create or update PSAP profiles based on the response to a test emergency services call. The profile includes an indication of the services and media format that are supported by the PSAP for each cell sector. For instance, the network server, in at least one embodiment, periodically transmits test emergency services calls to the loopback interface of the PSAP to query the capability of the PSAP. The PSAP or NG911 network may proxy or route test emergency services calls based on media format. The identified PSAP may support a first group of media formats but a second PSAP related to the identified PSAP may support a second group of media formats. If the identified PSAP does not support the media formats identified in the test emergency services calls, the second PSAP receives the test emergency services calls from the identified PSAP or NG911 network and provides a response to the identified PSAP or the NG911 network. The network server receives the responses and stores the capability information in a database.

Accordingly, embodiments of this invention provide a means to automatically determine the media handling capabilities of each of the over 6,000 PSAPs that might receive a NG911 emergency service call. The response provides an indication of whether the PSAP is ready for next generation 911 services and if so, what media formats it provides support for. In other words, when a wireless device transmits a next generation 911 emergency services call having a supported media format, the PSAP in the cell sector of the wireless device responds without rejecting the next generation 911 emergency services call as unsupported. If an unsupported media format of the next generation 911 emergency services call is received by the originating network from the wireless device, the media format may be converted or modified to a media format known to be supported by one or more PSAPs associated with the cell sector. Alternatively, the next generation 911 emergency services call may be rejected or proxied to a related PSAP.

A server associated with originating network may periodically generate test emergency services calls, in one embodiment. The server processes the PSAP responses to the test emergency services calls. The server stores the capabilities of each PSAP that responds to the test emergency services calls. The capabilities indicate the media formats that are supported by the PSAPs.

For instance, the network server may identify each of the media formats that are currently supported by the wireless network or the wireless devices connected to the wireless network. The media formats include, among others, voice, text, and video. In turn, the network server selects a cell sector out of all the network cell sectors and stores the cell sector identification in a database. The database stores profile for PSAP. For each cell sector within an originating network, the database stores profiles for the PSAPs that are providing known media format support within the cell sector. The cell sectors selected for test emergency services calls may be selected randomly by the network server. In certain embodiments, the geographical location, e.g., latitude and longitude, of the selected cell sectors is also recorded in the database. The network server chooses one or more media formats to include in a test emergency services call. The media formats may be combined in the test emergency services call based on the network server selections. The media format selections that form the combinations may be random. In one embodiment, each cell sector is tested for all of the media formats and for each combination of media formats. In one embodiment, the test emergency services calls may be next generation 9-1-1 calls. The test emergency services calls may be formatted as SIP INVITEs. These SIP INVITEs may contain the cell sector location and the selected media format or combination of media formats being tested. The test emergency services calls are routed to the PSAP that covers the location identified by the cell sector and possibly the requested media formats. Responses to the test emergency services calls are generated by the PSAP and returned to the network server. The response may include an identifier for the PSAP that received the test emergency services calls and indications of which (if any) of the media formats or versions of the media formats requested in the test emergency services calls are supported by the PSAP. In some embodiments, the response is an OK response. The OK response indicates that the PSAP supports (some of) the media format included in the test emergency services calls. In other embodiments, the response is an error message that indicates that the PSAP does not support the media format included in the test emergency services calls. The profile is updated with the cell sector, PSAP identifier information, and an indication of the media formats (and combinations of media formats) that are supported and media formats that are not supported by the identified PSAP. If the test emergency services calls were processed by the PSAP and an OK response is generated, then the network server knows the PSAP supports the particular media format. If the test emergency services calls were processed by the PSAP and an error response is generated, such as "415 Unsupported Media Type," then the network server knows that the PSAP does not support the particular media format.

Throughout this patent, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the embodiments of the invention. The following is a list of these acronyms:

| | |
|---|---|
| BTS | Base Transceiver Station |
| CDMA | Code Division Multiple Access |
| CD-ROM | Compact Disc, Read Only Memory |
| DVD | Digital Versatile Disc |
| EEPROM | Electrically Erasable Programmable Memory |
| GPRS | General Packet Radio Service |
| GPS | Global Positioning System |
| GSM | Global System for Mobile communications (Groupe Spécial Mobile) |
| IP | Internet Protocol |
| IPv4 | Internet Protocol Version Four |
| IPv6 | Internet Protocol Version Six |
| LED | Light Emitting Diode |
| LTE | Long Term Evolution |
| NG | Next Generation |
| NFC | Near-Field-Communication |
| PSAP | Public Safety Answering Platform |
| PTT | Push-To-Talk |
| RAM | Random Access Memory |

| | |
|---|---|
| ROM | Read Only Memory |
| RNC | Radio Network Controller |
| SDP | Session Description Protocol |
| SIP | Session Initiation Protocol |
| SMS | Short Message Service |
| TDMA | Time Division Multiple Access |
| UMTS | Universal Mobile Telecommunications System |
| USB | Universal Serial Bus |
| Wi-Fi | Wireless Fidelity |
| WiMAX | Worldwide Interoperability for Microwave Access |

Embodiments of the invention can take the form of a method, server, network device, system, or computer-readable media embodied with a specific set of computer-executable instructions. Computer-readable media include both volatile and nonvolatile media, removable and nonremovable media, and contemplate media readable by a database, a switch, and various other network and computing devices. Computer-readable media include communication media and computer storage media implemented in any method or technology that stores information. Examples of stored information include computer-useable instructions, data structures, program components, and other data representations. Examples of computer-readable media include RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. The computer-readable media can store data momentarily, temporarily, or permanently.

In one embodiment, the network server is configured with several input and output components. The network server may include applications for communicating with different networks. The applications may include an emergency services applications. The emergency services application allows wireless devices to communicate with emergency service centers. In one embodiment, the applications include a test emergency services application, which allows the network server to test various media formats supported by the wireless network at multiple PSAPs. The network server may store PSAP profile data like the media formats supported by the PSAP and the unsupported media formats temporarily or permanently. The network server may utilize the input and output component of the network server to implement operations requested by the applications.

FIG. 1 depicts a block diagram of an exemplary network server in accordance with embodiments of the invention. Turning now to FIG. 1, a block diagram of an illustrative network server is provided and referenced generally by numeral 100. Although some components are shown in the singular, they may be plural. For example, network server 100 might include multiple processors or multiple radios, etc. A network server 100 may be one of many devices, including, but not limited to, a switch, a router, a mobility agent, a bridge. As illustratively shown, network server 100 includes a bus 110 that directly or indirectly couples various components together including memory 112, a processor 114, a presentation component 116, a radio 117, input/output ports 118, input/output components 120, and a power supply 122.

We have previously described various memory components that memory 112 might take the form of. Memory component 112 can include any type of medium that is capable of storing information (e.g., a database 112A). The database 112A may be configured to store network access credentials, including a network identifier, password, or key associated with the network server 100; location information based on GPS; and any information that the network server 100 transmits to the wireless network. The database 112A may also store applications like emergency services call applications and test emergency services call applications associated with the network server 100. The emergency services may include fire, police, or medical services.

Processor 114 might actually be multiple processors that receive instructions associated with the applications and process the instructions accordingly. Presentation component 116 includes the likes of a display, a speaker, as well as other components that can present information (such as a lamp (LED), or even lighted keyboards) associated with the outputs of applications or other components of the network server 100.

The network server 100 may store cell sector information and may generate profiles based on responses received from PSAPs within the cell sectors. The PSAP responses are generated in reply to test emergency service calls. The response confirms whether media formats supported by the wireless network are supported by the PSAPs. The profiles may be stored by the network server 100.

The communication interface of the network server 100 may be a radio 117 that facilitates communication with a wireless telecommunications network. Illustrative wireless telecommunications technologies include CDMA, GPRS, TDMA, GSM, WIMAX, LTE, UMTS, and the like. In some embodiments, radio 117 might also facilitate other types of wireless communications including Wi-Fi communications, Bluetooth™, Zigbee, or other near-field communication. In other embodiments, the communication interface of the network server 100 may be a wired line like Ethernet.

Input/output port 118 of network server 100 might take on a variety of forms. Illustrative input/output ports include a USB jack, stereo jack, infrared port, proprietary communications ports, and the like. Input/output components 120 include items such as keyboards, microphones, touch screens, and any other item usable to directly or indirectly input data into network server 100. Power supply 122 includes items such as batteries, fuel cells, or any other component that can act as a power source to power network device 100.

Accordingly, a network server 100 generates test emergency services calls and receives responses that indicate whether PSAPs support the media format for a particular cell sector. The network server 100 processes the responses to generate a profile. It will be understood and appreciated by those of ordinary skill in the art that the network server 100 shown in FIG. 1 is merely an example of one suitable network server 100 and is not intended to suggest any limitation as to the scope of use or functionality of the embodiments of the invention. Neither should the network server 100 be interpreted as having any dependency or requirement related to any single component or combination of components illustrated therein. The single unit depictions are meant for clarity, not to limit the scope of embodiments in any form.

In some embodiments, a network server on the wireless network generates test emergency services calls. The test emergency services calls are routed to one or more PSAPs based on the cell sectors identified in the test emergency services calls (and possibly on the media formats requested). The test emergency services calls indicate one or more media formats that are supported by the wireless network. The PSAP responses are processed and saved to the database in profiles that specify the media formats that are supported or unsupported by the responding PSAP for the specific cell sector. Subsequent test emergency services call signaling and answer delays may be reduced by leveraging the PSAP profiles that identify both supported media formats and unsupported media formats. The network server may extract the supported media formats and generate additional test emergency services calls for combinations that are limited to the extracted supported media formats. Alternatively, the network server may extract the unsupported media formats and generate additional test emergency services calls that are limited to the extracted unsupported media formats. In one embodiment, in addition to routing to PSAPs based on cell sector location, the PSAP receiving the test emergency services calls may be linked to a secondary PSAP that provides support for some of the media formats that are not supported by the receiving PSAP.

Figure 2:
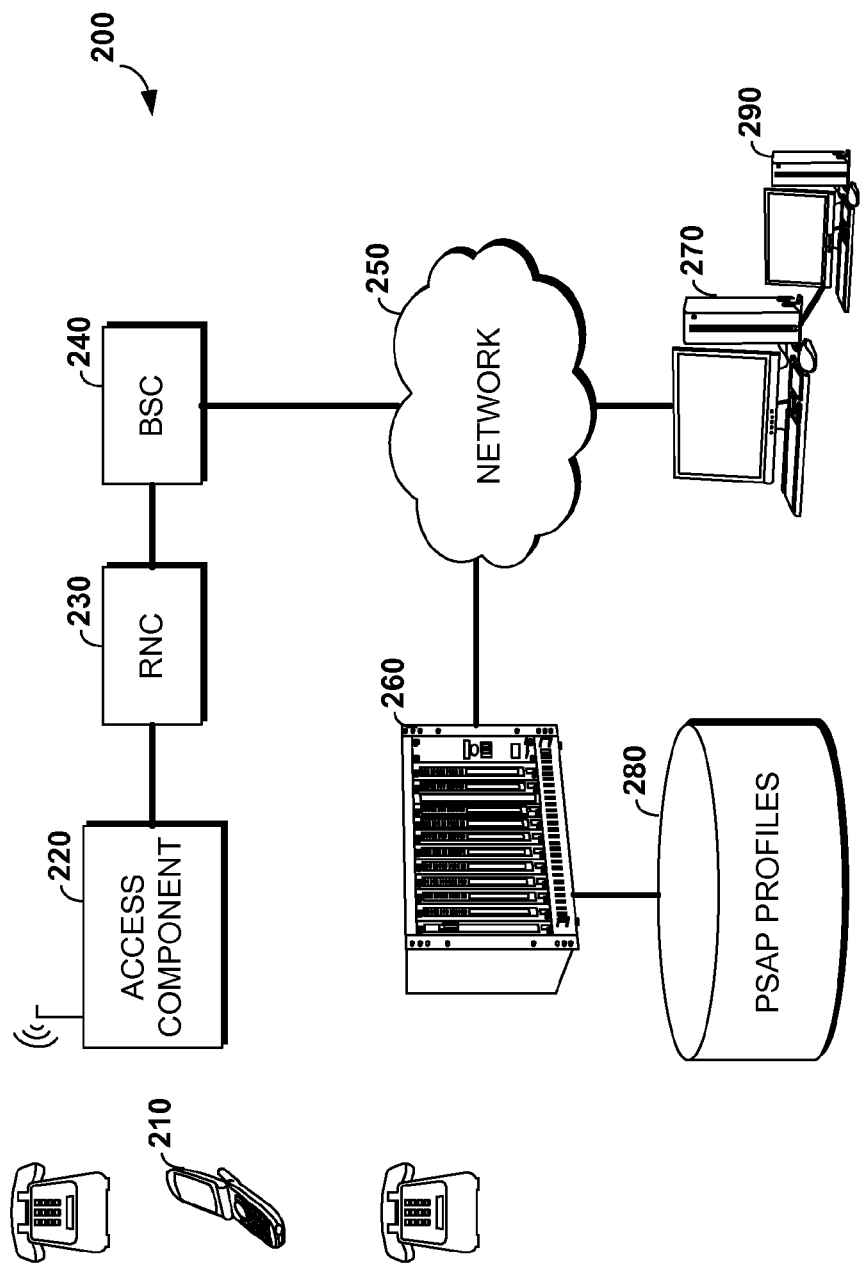
FIG. 2 depicts a network diagram of an exemplary communication system in accordance with embodiments of the invention.

FIG. 2 depicts a network diagram of an exemplary communication system in accordance with embodiments of the invention. Turning now to FIG. 2, an illustrative computing system 200 is provided and referenced generally by the numeral 200, which depicts an illustrative operating environment for determining whether media formats supported by the communication devices 210 are also supported by the PSAPs 270 or 290. The computing system 200 may include communication devices 210, access components 220, RNC 230, BSC 240, network 250, network server 260, PSAP 270, profile database 280, and secondary PSAP 290.

Communication devices 210 may be used for voice, data, or a combination of voice and data communication. The communication devices 210 may connect to network 250 to complete communication requests. The communication requests may include requests for emergency services. Communication devices 210 may communicate among themselves over a near-field channel in certain embodiments. Communication devices 210 may connect to BSC 240 or a third party via communication link. The BSC 240 or third party may facilitate communication to and among the communication devices 210.

The access component 220 may be a wireless router. Generally, the access component 220 provides access to what some skilled artisans refer to as a wireless communications network 250. The access component 220 may be one or more of a base transceiver station (BTS) tower, a Wi-Fi Router, and any other device that facilitates communication between communication device 210 and network 250. In one embodiment, the access component 220 includes both a Wi-Fi Router and a BTS tower. In another embodiment, access component 220 is a BTS tower.

A radio network controller (RNC) 230 performs various functions, such as managing radio channels, power control, load control, admission control, packet scheduling, handover control, macrodiversity, security functions, and mobility management. A base station controller (BSC) 240 and network server 260 are also shown in FIG. 2. The BSC 240 acts as the intelligence behind base transceiver stations (BTS) (not shown), and handles allocation of radio channels, receives statistics from the communication devices 210, generates emergency services calls when commanded, and controls handovers from one BTS to another BTS.

The network 250 connects the BSC 240 to the network server 260 and PSAP 270. The network 250 may be an IP network operating one or both of IPv4 and IPv6. The network 250 provides communication links that may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi connection to a device (e.g., wireless hotspot) that provides access to a wireless communications network, such as a WLAN connection using 802.11 protocol. A long-range connection may include a connection using one or more of CDMA, GPRS, GSM, TDMA, and 802.16. The network 250 routes the test emergency services calls generated by the network server 260 to appropriate PSAPs 270. The PSAP responses are transmitted to the network server 260 over the network 250.

The network server 260 may be a switch that is configured to generate the test emergency services calls. The test emergency services calls are transmitted to the PSAP. The network server 260 probes the PSAPs 270 with the test emergency services calls. From the responses generated by the PSAPs 270, the network server 260 may determine which of the next generation 9-1-1 capabilities are supported. These test emergency services calls are generated automatically and reduce the manual effort required to test and configure the PSAP 270 and eliminate costs and errors associated with manual testing. The network server 260 extracts the PSAP media format support information and identifiers from the responses and creates a profile for storage in the database 280.

When the network server 260 generates the test emergency services calls to identify the NG 9-1-1 media capabilities of the PSAPs 270 or 290 for each of the cell sectors, the network server may generate one test emergency services call per media format per sector per cell site. For instance, a wireless network that supports five media formats and having about 40,000 cell sites and three sectors per cell sites might result in over 600,000 test emergency services call. The test emergency services calls may be periodically, e.g., quarterly or semi-annually, re-run to automatically identify any changes in support by the PSAPs 270. However, 600,000 test emergency services calls may overwhelm the communication links between network server 260 and the PSAPs 270. Embodiments of the invention provide network servers 260 that are configured to reduce the number of test emergency services calls by leveraging PSAP profile data. Subsequent test emergency services calls may be reduced by leveraging the PSAP profiles that identify both supported media formats and unsupported media formats. The network server 260 may extract the supported media formats and generate additional test emergency services calls for combinations that are limited to the extracted supported media formats. Alternatively, the network server 260 may extract the unsupported media formats and generate additional test emergency services calls that are limited to the extracted unsupported media formats.

The PSAP 270 is a platform that provides for citizens to contact Public Safety agencies for a particular region during an emergency situation. Over 6,000 PSAPs 270 may operate within the coverage area of the wireless network 250. The PSAPs 270 may have a disparity in technology deployment, advancement, and upgrades, which increases the complexity of determining which PSAPs 270 support media formats available on the wireless network. To identify the capabilities of each PSAP 270, the network server 260 sends test emergency services calls to the PSAP 270. The test emergency services calls, in some embodiments, are sent to the loopback interface of the PSAP 270. In response to the test emergency services calls, the PSAP 270 merely responds the same way it would for a real next generation 9-1-1 emergency service call without engaging a Public Safety call dispatcher. The results of the test emergency services calls are received by the network server 260, which builds a profile of the current PSAP media capabilities.

In some embodiments, the PSAP 270 may have one or more secondary PSAPs 290. The secondary PSAPs 290 may be related to PSAP 270 by contract or by law. PSAP 270 may support a first group of media format and PSAPs 290 may support other groups of media format not included in the first group.

For example, during a transition period—one or more decades—to NG 9-1-1, there are likely some cases where routing of NG 9-1-1 to PSAPs in addition to being geographically based may be media format based. Because PSAPs 270 are configured to support voice traffic, many will be updated for NG 9-1-1 by including support for voice, text, video, and images, etc. Some PSAPs 270 may transition to NG 9-1-1 for voice and text only and not support NG 9-1-1 video or images. To provide support for the new media formats in the area served by the PSAP 270, cooperative arrangements with a state or regional wide NG 9-1-1 PSAP 290 may be made. The PSAP 290 may be configured to only handle the new media formats that the local PSAP 270 is unable to handle. In some embodiments, the PSAP 270 and 290 may share a cell sector and the PSAP 270 may routes the test emergency services request to a PSAP, like PSAP 290, in the cell sector that provides support for media formats unsupported by PSAP 270.

Caller "A" and caller "B" may both be located in the same cell sector in downtown Portland. Caller "A" places a normal 911 voice call in the western Oregon region, which has been upgraded to NG 9-1-1 with a regional PSAP 290 in Salem handling text and video emergency service calls. The Portland PSAP, which is the local PSAP 270, may be configured to handle voice calls only. Caller "A's" call may routed by the network 250 to the regional NG 9-1-1 PSAP 290, which identifies media included in the emergency services call as voice. Because PSAP 290 does not support voice, the call is routed to the local PSAP 270 for processing. In some embodiments, the network 250 may utilize the caller's location to select the PSAP 270 or 290. Because caller A may identified as being in the Portland PSAP service area, the call is delivered to the Portland PSAP for voice 911 call processing. On the other hand, caller "B" may send a text (instant messaging) based NG 9-1-1 emergency services call to the network 250, which is delivered to the regional NG9-1-1 PSAP 290. Because the regional PSAP 290 supports text and the regional PSAP checks via agreement or a database routing record, whether the local PSAP 270 in Portland supports text. The regional NG 9-1-1 network 290 confirms that the local PSAP 270 does not support test and routes the test emergency services call to the regional PSAP. The network server 260 may be configured to distinguish the above scenario from situations where a NG 9-1-1 PSAP only supports voice and doesn't have any arrangements for handling nonvoice media, text, video, images, etc.

The profile database 280 stores the media capabilities for each PSAP 270 that responded to the test emergency services calls. The network server 260 processes the responses and extracts, among other things, media support and identification information. In some embodiments, multiple PSAPs 270 or 290 may respond to an emergency service call that has a combination of media formats. The database 280 may store whether the media support is enabled via proxy based on the network servers 260 instructions. The database 280 stores identifiers for the PSAPs 270 or 290, may store the media formats supported, or the media formats that are not supported or both. The database 280 may also store the location associated with the PSAP 270 or 290. The location may correspond to the cell sector identified in the test emergency services call. Accordingly, database 280 may store carrier coverage maps showing the location of the PSAP 270 or 290 and identifying the media format supported by each of illustrated PSAPs 270 or 290. The profile stored by the database may include data about a type of emergency service requested, e.g., fire, police, etc., the PSAP identifier, and the media formats supported and unsupported. In one embodiment, the media formats include phone calls, text messages, PTT, SMS, video chat, two way communication, one way communication, etc.

The illustrated elements of computing system 200 are meant to be exemplary in nature, and the various lower-level details of the elements are not elaborated on so as to not obscure the embodiments of the invention. Clearly, some of the elements may be absent in some embodiments of the invention, and additional elements not shown may also be part of computing system 200. Attempting to show all of the various elements of computing system 200 would obscure certain novel aspects, and we will refrain from such elaboration at least for the sake of brevity.

A network a server, in one embodiment, is configured to build a profile for each cell sector and PSAP within the coverage area of the wireless network. The network server selects a cell sector maintained by the wireless network provider. In turn, the network server generates test emergency services calls. The test emergency services calls are transmitted to a PSAP. In response to the test emergency services calls, the PSAP provides a response that indicates whether the PSAP supports a media format identified in the test emergency services call. The PSAP responses are used to populate the database. Subsequent test emergency services calls may use the profile data. The network server may generate test emergency services calls for the media formats identified as unsupported media formats in the profile data.

Figure 3:
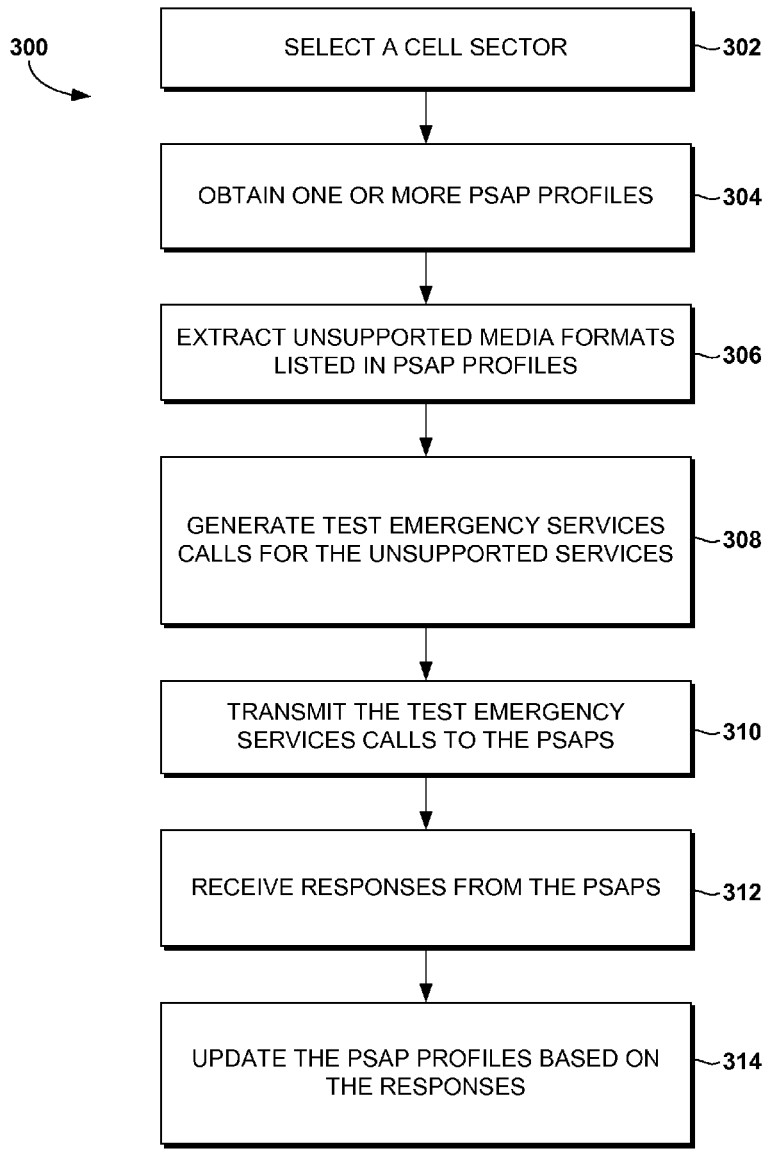
FIG. 3 depicts an exemplary logic diagram for updating a PSAP profile based on unsupported media formats currently included in the PSAP profile in accordance with embodiments of the invention.

FIG. 3 depicts an exemplary logic diagram for updating a PSAP profile based on unsupported media formats currently included in the PSAP profile in accordance with embodiments of the invention. Turning now to FIG. 3, in step 302, the network server selects a cell sector maintained by a wireless network provider. In step 304, the network server obtains one or more PSAP profiles that correspond to the selected cell sector. Each cell sector maintained by the network provider is identified in a separate test emergency services call.

The network server, in step 306, extracts from the PSAP profiles media formats that are listed as unsupported media formats, newly added media formats, or media formats that were not included in prior test emergency services calls. Alternatively, the network server may select an originating network supported media format (system wide value) not contained in the media formats in the PSAP profiles associated with the selected cell sector. The media formats include push to talk (PTT), text, video, voice, instant messaging, email, two way communication, and one way communication. The network server generates additional test emergency services calls having one or more of the media formats identified in the PSAP profile as unsupported media formats, newly added media formats, or media formats that were not included in prior test emergency services calls in step 308. The network server transmits the test emergency services calls to the NG 911 network or the PSAPs identified in the PSAP profile in step 310. In one embodiment, the test emergency services calls are transmitted to a loopback interface of the PSAP and the test emergency services calls are one of a: session description protocol (SDP) message or a session initiation protocol (SIP) message. The test emergency services calls include at least one media format that is supported by the network provider. In some embodiments, the test emergency services calls identify at least two media formats that are supported by the network provider, wherein the two media formats may be transmitted at the same time to the PSAPs.

The at least two media formats are among the supported media formats identified in the PSAPs profiles and the at least two media formats, in some embodiments, are not selected from the unsupported media formats, newly added media formats, or media formats that were not included in prior test emergency services calls as identified in the PSAPs profiles.

In step 312, the network server receives responses from the PSAPs that indicate whether the PSAPs support any of the media formats identified in the test emergency services calls. The network server may receive a response from a PSAP selected either by NG 911 network routing based on the media formats offered as described above. In at least one embodiment, the response from the identified PSAPs may be based on the capabilities of secondary PSAPs that are related to the identified PSAPs. The secondary PSAPs and the identified PSAPs are related such that the identified PSAPs are configured to respond to test emergency services calls having a first group of supported media formats and the secondary PSAPs are configured to respond to test emergency services calls having a second group of supported media formats that does not overlap with the first group via proxy with the identified PSAPs.

The network server extracts PSAP identifiers from the responses. In turn, the network server, in step 314, updates the cell sector profiles of the responding PSAPs based on the received responses. The profiles include the identifiers and media format support information for each cell sector and are stored for each cell sector in the database. Accordingly, the results of the test emergency services calls are used to build and update a profile of the current PSAP media capabilities.

In yet another embodiment, the PSAP provides an indication of some of the PSAP's supported media formats in response to the test emergency services calls. As explained above, the PSAP may obtain a test emergency service call at the loopback interface. The PSAP, in turn, extracts the media formats requested in the test emergency service call. The PSAP may identify current capabilities of the PSAP and determine whether a match exists between the extracted media formats and the current capabilities. When a match is found, the PSAP generates a response that includes some of the matching capabilities. When a match is not found, the response may be generated based on the capabilities of one or more secondary PSAPs. The receiving PSAP transmits the response to the network server.

Figure 4:
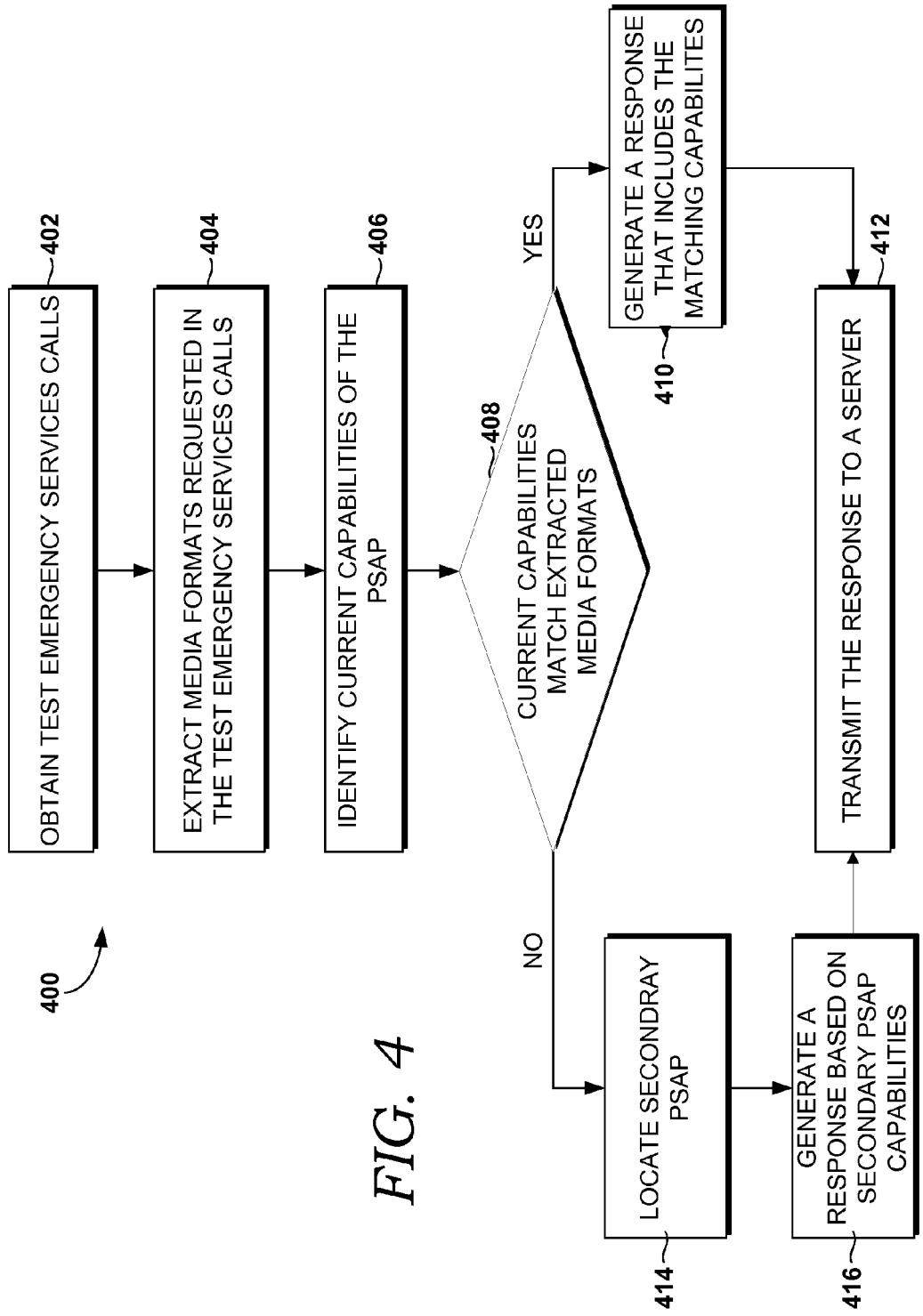
FIG. 4 depicts an exemplary logic diagram for providing, via a first PSAP or second PSAP, responses to test emergency services calls in accordance with embodiments of the invention.

FIG. 4 depicts an exemplary logic diagram for providing, via a first PSAP or second PSAP, a response to test emergency services calls in accordance with embodiments of the invention. Turning now to FIG. 4, in step 402, the PSAP obtains a test emergency services calls at the loopback interface. The test emergency services calls are one of a SDP message or SIP message.

In step 404, the PSAP extracts media formats requested in the test emergency services calls. The PSAP, in step 406, identifies its current capabilities, e.g., the supported media formats. The PSAP determines whether any of the current capabilities match the extracted multimedia formats, in step 408.

When a match is found, in step 410, the PSAP generates a response that includes the a portion of the matching capabilities. The PSAP, in step 412, transmits the response to the network server. When a match is not found, in step 414, the PSAP locates a secondary PSAP that provides additional media format support. In turn, in step 416, the PSAP generates a response based on the secondary PSAP capabilities. The response is then transmitted by the PSAP to the network server in step 412.

The responses are one of a SDP or SIP message. The response includes an identifier for the PSAP. The response includes a portion of the media formats supported by the PSAP. The response indicates that media formats are unsupported when both the PSAP and the secondary PSAP fail to support the media formats. The response may be, in at least one embodiment, formatted as a SDP message. Thus, the PSAP is configured to respond to the test emergency services calls without disrupting real emergency services calls that should be routed to a dispatcher. The PSAP media format support is determined without emergency services dispatcher input.

In another embodiment, a network server is configured to update a profile for each cell sector and PSAP within the coverage area of the wireless network. The network server selects a cell sector maintained by the wireless network provider. In turn, the network server generates test emergency services calls. The test emergency services calls are transmitted to a PSAP. In response to the test emergency services calls, the PSAP provides a response that indicates whether the PSAP supports a media format identified in the test emergency services call. The PSAP responses are used to populate the database. Subsequent test emergency services calls may use the profile data. The networks server may generate test emergency services calls with combinations of media formats, e.g., voice and video. The combinations may include 2 media formats, 3 media formats, 4 media formats, etc. The network server may only use combinations that are realistic, e.g., 2 audio codecs are not likely to be used simultaneously except possibly at higher qualities for stereo or HD. The network server processes the response for storage in the PSAP profile. The result is that by building these PSAP profiles, the network server may perform remedial actions, e.g., routing or conversions, when media is requested in a particular cell sector and the network server knows from the profile whether a particular media combination will be supported by PSAP that is likely to receive the real emergency services call based on the profiles.

Figure 5:
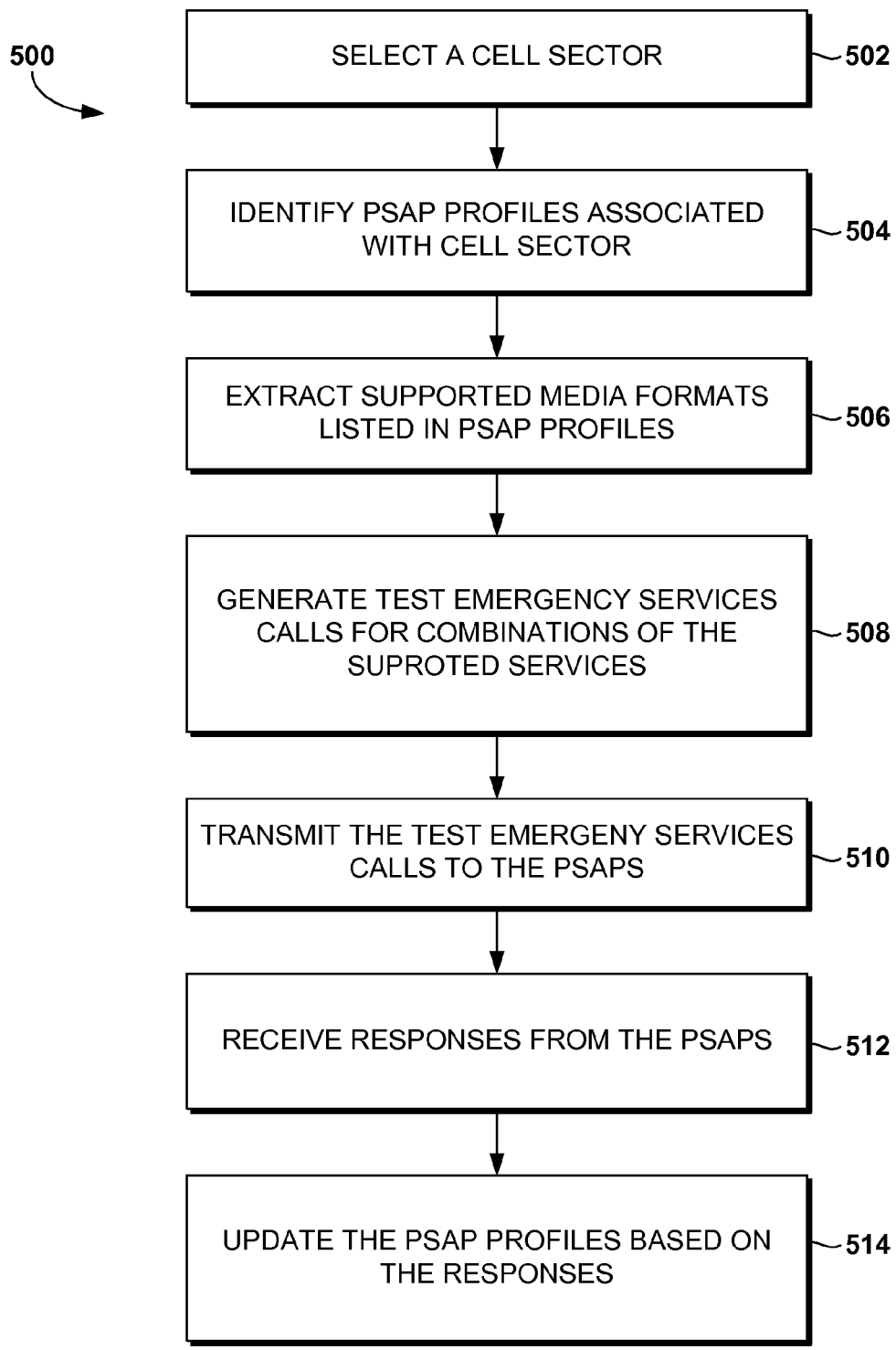
FIG. 5 depicts an exemplary logic diagram for updating a PSAP profile based on supported media formats currently included in the PSAP profile in accordance with embodiments of the invention.

FIG. 5 depicts an exemplary logic diagram for updating a PSAP profile based on supported media formats currently included in the PSAP profile in accordance with embodiments of the invention. Turning now to FIG. 5, in step 502, the network server selects a cell sector maintained by a wireless network provider. In step 504, the network server identifies one or more PSAP profiles that correspond to the selected cell sector. Each cell sector maintained by the network provider is identified in a separate test emergency services call. In step 506, the network server extracts from the identified PSAPs media formats that are supported by the PSAPs. The media formats include PTT, text, video, voice, instant messaging, email, two way communication, one way communication.

The network server, in step 508, generates test emergency services calls that include a combination of the supported media formats for the corresponding PSAP. The network server, in turn, transmits the test emergency services calls having the combination of the supported media formats to the identified PSAPs in step 510. In some embodiments, the test emergency services calls are transmitted to a loopback interface of the PSAP.

In step 512, the network server receives responses from the identified PSAPs. The network server updates the profiles for identified PSAPs with the responses. The PSAP returns a response indicating that the PSAP supports the combination. Alternatively, the PSAP returns a response indicating that the PSAP does not support the combination. The response may be a SDP message.

In one embodiment, the database is updated with a PSAP profile based on a test emergency services call. The test emergency services call may be a SDP message generated by a network server of the wireless network. The SDP message is routed to the appropriate PSAP based on the cell sector identified in the test emergency services call. The PSAP generates a SDP response that indicates whether the PSAP supports one or more media formats identified in the SDP message. The SDP response is received at the network server, which updates the PSAP profile. The response generated by the PSAP may be based on a proxy response. If the PSAP does not support a media format, a proxy request may be generated to determine whether one or more secondary PSAP support the media format.

Figure 6:
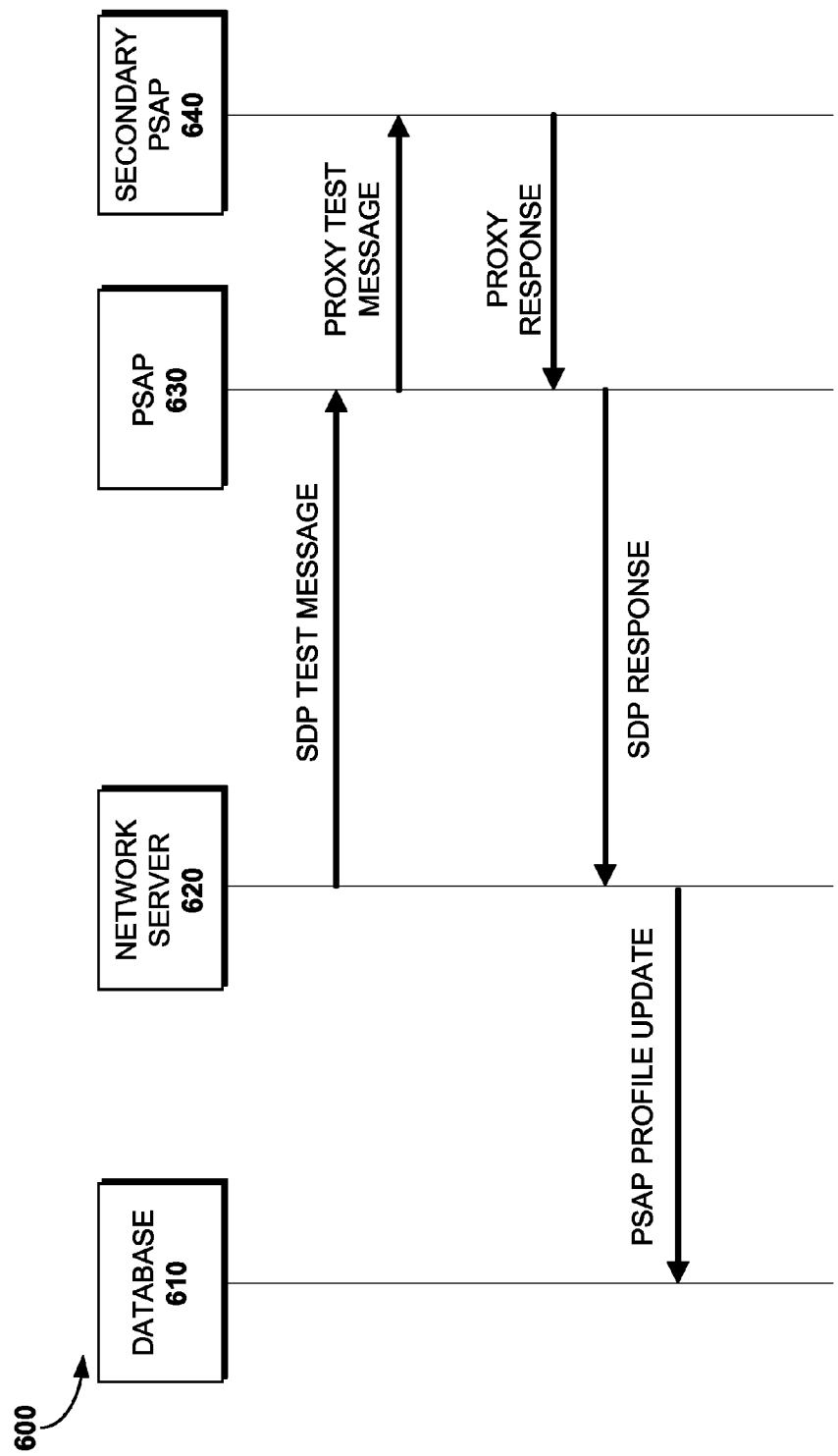
FIG. 6 depicts an exemplary communication flow diagram receiving, via a first PSAP or second PSAP, responses to the test emergency services calls in accordance with embodiments of the invention.

FIG. 6 depicts an exemplary communication flow diagram receiving, via a first PSAP or second PSAP, a response to the test emergency services call in accordance with embodiments of the invention. A database 610, network server 620, PSAP 630, and secondary PSAP 640 exchange communication messages. The network server 620 generates a SDP message. The SDP message is a test emergency services call that identifies the cell sector and media formats. The SDP message is routed to a PSAP 630 based on the cell sector. The PSAP 630 receives the SDP message and provides a SDP response. The SDP response indicates whether the media formats identified in the SDP message are supported by the PSAP 630 or 640. The network server 620 receives the SDP response and generates a profile update message that is transmitted to the database. The profile update message may include an identifier of the PSAP 630 or 640 and the media formats that are supported or not supported as indicated in the SDP response.

In some embodiments, the PSAP 630 may generate a proxy test message when the media support of the PSAP 630 does not include a media format identified by the network server 620. The proxy test message is transmitted to a secondary PSAP 640 from the PSAP 630, which received the SDP test message. The secondary PSAP 640 generates a proxy response that identifies the media format supported by the PSAP 640 and the unsupported media formats. The PSAP 630 receives the proxy response and updates the SDP response to include the media format supported by both the PSAP 630 and the proxy PSAP 640. The SDP response may identify both PSAPs, the supported media format, and the unsupported media formats. In an embodiment, the SDP response generated by PSAP 630 may indicate that PSAP 640 is a proxy.

In certain embodiments, PSAPs are selected based on a combination of location and media formats. The location may be determined from cell sector. After filtering PSAPs based on location, the NG 911 network may determine whether any PSAPs matching the location fulfill the media formats. So, for example, the NG911 network (not originating network) may route voice calls to PSAP A covering the cell sector and text calls to PSAP B covering the same cell sector.

Figure 7:
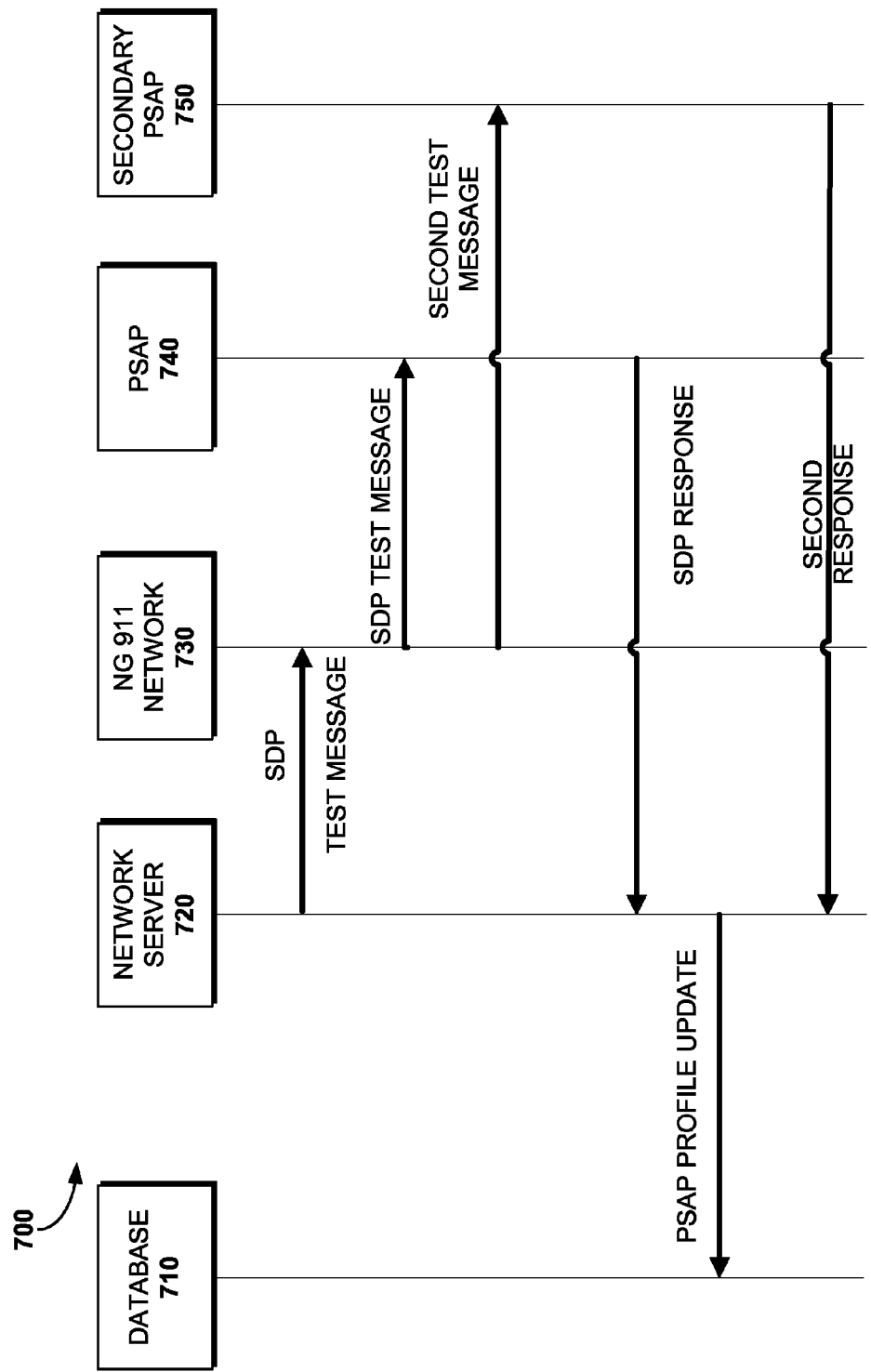
FIG. 7 depicts an exemplary communication flow diagram routing the test emergency services calls in accordance with embodiments of the invention.

FIG. 7 depicts an exemplary communication flow diagram routing the test emergency services calls in accordance with embodiments of the invention. A database 710, network server 720, NG 911 network 730, PSAP 740, and secondary PSAP 750 exchange communication messages. The network server 620 generates a SDP message. The SDP message is a test emergency services call that identifies the cell sector and media formats. The SDP message is routed to the NG 911 network 730. The NG 911 network 730 receives all real and test emergency services calls. In an embodiments, the network server includes a routing table that identifies the NG 911 network 730 as the recipient of real or test emergency services calls. The NG 911 network 730 receives the SDP test message. In turn, the NG 911 network 730 selects an appropriate PSAP based on the location. The location may be associated with the cell sector included in the SDP test message. The NG 911 network 730 may select PSAP 740 based on the cell sector.

In one embodiment, where the SDP test message includes a combination of media formats, the NG 911 network 730 may select multiple PSAPs 740 and 750 to provide support for the SDP test message. The NG 911 network 730 selects PSAP that have same location as the cell sector included in the SDP test message. Also, the NG 911 network 730 identifies the selected PSAPs that support the media formats requested. In turn, the NG 911 network 730 transmits the SDP test messages to the selected PSAPs. For instance, The PSAP 740 may receive the SDP message and provides a SDP response. The SDP response indicates whether the media formats identified in the SDP message are supported by the PSAP 730. The PSAP 750 may receives a second SDP message and provides a SDP response. The first SDP and second SDP messages are directed to the different media formats, where the first SDP message includes a format unsupported by PSAP 750 and the second SDP message is directed to media formats not supported by the first PSAP 740. The second SDP responses indicates whether the media formats identified in the SDP message are supported by the PSAP 730. In some embodiments, these communication are sent and receive in parallel.

The network server 720 receives the first and second SDP responses and generates a profile update message that is transmitted to the database 710. The profile update message may include an identifier of the PSAP 740 or 750 and the media formats that are supported or not supported as indicated in the first and second SDP responses.

In summary, embodiments of the invention configure network servers to probe PSAPs in coverage areas supported by the wireless network providers. The network servers utilize SDP or SIP messages to probe media support at the PSAP. The SDP or SIP messages describe media support by the wireless network and the cell sectors of interest. These messages are routed to the PSAP, which provides an OK response or Error response. These responses are processed by the network server to create and update PSAP profiles for the wireless network.

Real next generation 9-1-1 calls are not used to create or update the PSAP profile because real next generation 9-1-1 calls may burden dispatchers and may not include the necessary diversity of media format usage. Importantly, the distribution of real emergency calls cannot be guaranteed to use or try all the media types that the wireless network supports through all of the cell sectors. To obtain a sample size of any significance would take a very long period of time (possibly decades). The automatic test emergency service calls includes all the media formats supported by the originating network. And the PSAP provides response to the test emergency service calls in a much shorter period of time because human intervention is not required.

Embodiments of the invention reduce the number of test emergency services calls that are generated based on PSAP profiles that include supported media format and unsupported media formats of the PSAP. A network server selects a cell sector out of all the network cell sectors and records the location of the cell site. The network server issues a series of test emergency services calls with the location of the selected cell sector. The network server may issue test emergency services calls for each of the media formats supported by the wireless network. The network server receives the responses and identifies the media supported and unsupported. If the responses are all from the same PSAP, then the network server updates the supported capabilities in that PSAP profile. If the responses are not all from the same PSAP, the network server updates the supported capabilities in PSAP profiles for each PSAP responding. In one embodiment, the network server generates tests emergency services calls successively increasing the combinations of media formats (e.g. voice and video) (pairwise, 3-way, 4-way, etc). The database may be used by the network server to influence routing or conversion of the media formats in real emergency services calls.

In one embodiment, the network server presumes that a PSAP will not remove or stop supporting a media format once it is implemented because removing support will affect NG 9-1-1 service negatively. A PSAP will only add support for additional or new media types. Once a media format is indicated as supported through a test emergency services call for the particular cell sector, then it doesn't have to be tested again. The network server may extract from the PSAP profile for the cell sector a media format that is supported by the wireless network but is identified as unsupported in the PSAP profile. The network server generates a test NG 9-1-1 call containing the cell site location and the selected media format. If the test emergency services call was accepted by the PSAP, then it is known that the PSAP supports the particular media and the PSAP profile for that cell sector is updated accordingly. If the test emergency services call was rejected with an indication that the media format was not supported such as 415 Unsupported Media Type, then it is known that the PSAP does not support the particular media.

In another embodiment, the network server limits combination for media formats that are supported by the PSAP. If a media format is not supported, then test emergency services calls having combinations of the unsupported media formats may indicate that the particular media format is still not supported. So, the network server may eliminate test emergency services calls with the combination until all the media formats in the combination are individually supported. When an unsupported media format becomes supported, then the network server runs a combination test including the media format. The network server extracts from the PSAP profile for the cell sector two or more media formats that are supported by both the PSAP and the wireless network. The network server places a test NG 9-1-1 call containing the cell site location and the selected combination of media formats. If the test emergency services call was accepted, then it is known that the PSAP supports the particular media format combination. If the test emergency services call was rejected with an indication that the media format was not supported such as "415 Unsupported Media Type," then it is known that the PSAP does not support the particular media combination.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The technology claimed is:

1. Non-transitory computer-readable media having computer-executable instructions embodied thereon that, when executed, perform a method to update public safety answering platform (PSAP) profiles, the method comprising:

selecting a cell sector maintained by a network provider;

obtaining one or more PSAP profiles that correspond to the selected cell sector;

extracting from the PSAP profiles media formats that are listed as unsupported media formats, newly added media formats, or media formats that were not included in prior test emergency services calls;

generating test emergency services calls having one or more of the media formats identified in the PSAP profile as unsupported media formats, newly added media formats, or media formats that were not included in prior test emergency services calls;

transmitting the test emergency services calls to the PSAPs identified in the PSAP profile; and receiving responses from the PSAPs that indicates whether the PSAPs support media formats identified in the test emergency services calls.

2. The media of claim 1, wherein each cell sector maintained by the network provider is identified in a separate test emergency services call.

3. The media of claim 1, wherein the test emergency services calls are transmitted to a loopback interface of the PSAP and the test emergency services calls are one of a: session description protocol (SDP) message or a session initiation protocol (SIP) message.

4. The media of claim 1, wherein the test emergency services calls include at least one media format that is supported by the network provider.

5. The media of claim 1, wherein the test emergency services calls identify at least two media formats that are supported by the network provider, wherein the two media formats may be transmitted at the same time to the PSAPs.

6. The media of claim 5, wherein the at least two media formats are among the supported media formats identified in the PSAPs profiles and the at least two media formats are not selected from the unsupported media formats, newly added media formats, or media formats that were not included in prior test emergency services calls as identified in the PSAPs profiles.

7. The media of claim 1, wherein the media formats include push to talk (PTT), text, video, voice, instant messaging, email, two way communication, and one way communication.

8. The media of claim 1, further comprising: extracting PSAP identifiers from the response; creating or updating PSAP profiles that include the identifiers and media format support information for each cell sector; and storing the PSAP profiles for each cell sector in a database.

9. The media of claim 1, wherein the response from the identified PSAPs may be based on the capabilities of secondary PSAPs that are related to the identified PSAPs.

10. The media of claim 9, wherein the secondary PSAPs and the identified PSAPs are related such that the identified PSAPs are configured to respond to test emergency services calls having a first group of supported media formats and the secondary PSAPs are configured to respond to test emergency services calls having a second group of supported media formats that does not overlap with the first group via proxy with the identified PSAPs.

11. Non-transitory computer-readable media having computer-executable instructions embodied thereon that, when executed by a public safety answering platform, perform a method to generate a response to a test emergency services call received from a network server, the method comprising:

obtaining test emergency services calls at the PSAP;

extracting media formats requested in the test emergency services calls;

identifying current capabilities of the PSAP;

determining whether any of the current capabilities match the extracted multimedia formats;

when a match is found, generating a response that includes the matching capabilities, and when a match is not found, locating a secondary PSAP that provides additional media format support and generating a response based on the secondary PSAP capabilities; and transmitting the response to the server.

12. The media of claim 11, wherein the test emergency services calls are one of a SDP message or SIP message.

13. The media of claim 11, wherein the responses are one of a SDP or SIP message.

14. The media of claim 11, wherein the response includes an identifier for the PSAP.

15. The media of claim 11, wherein the response includes media formats supported by the PSAP.

16. The media of claim 11, wherein the response indicates that media formats are unsupported when both the PSAP and the secondary PSAP fail to support the media formats.

17. A computer-implemented method for reducing test emergency services calls, the method comprising:

selecting a cell sector of the wireless network;

identifying PSAP profiles associated with the cell sector;

extracting from the identified PSAP profiles media formats that are supported by the PSAPs;

generating test emergency service calls that include a content combination of the supported media formats for the corresponding PSAP;

transmitting the test emergency services calls having the combination of the supported media formats to the identified PSAPs;

receiving responses from the identified PSAPs;

updating the profiles for identified PSAPs with the responses.

18. The method of claim 17, wherein the media formats include PTT, text, video, voice, instant messaging, email, two communication, one way communication.

19. The method of claim 15, wherein the PSAP returns one of the following: a response indicating that the PSAP supports the combination or a response indicating that the PSAP does not support the combination.

20. The method of claim 15, wherein the test emergency services calls are transmitted to a loopback interface of the PSAP and the response from the PSAP is a SDP message.

* * * * *